Figure 1:
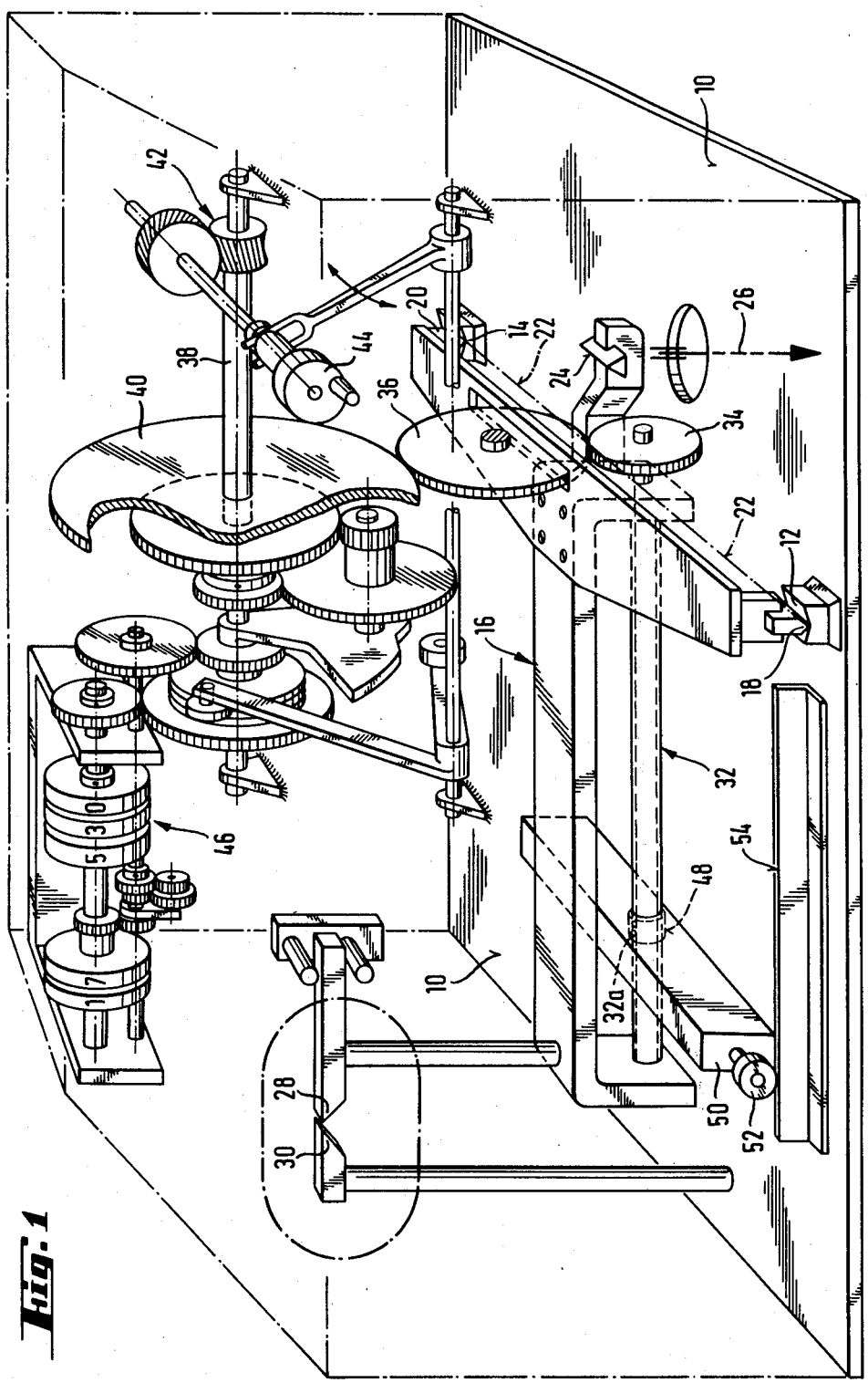

United States Patent [19]

Haack

[11] 4,401,177

[45] Aug. 30, 1983

[54] SLIDING WEIGHT SCALE

[75] Inventor: Werner Haack, Chur, Switzerland

[73] Assignee: Brevet AG, Schaan, Liechtenstein

[21] Appl. No.: 381,564

[22] Filed: May 24, 1982

[30] Foreign Application Priority Data

May 27, 1981 [DE] Fed. Rep. of Germany ....... 3121027

[51] Int. Cl.$^3$ ............................................. G01G 1/26
[52] U.S. Cl. .................................. 177/250; 177/214
[58] Field of Search ............... 177/191, 197, 213, 214, 177/215, 264, 250

[56] References Cited

U.S. PATENT DOCUMENTS

| 690,855 | 1/1902 | Greene | 177/213 |
|---|---|---|---|
| 1,484,358 | 2/1924 | Norton | 177/215 |
| 4,122,906 | 10/1978 | Storace | 177/213 |

Primary Examiner—Joseph W. Hartary
Attorney, Agent, or Firm—Toren, McGeady and Stanger

[57] ABSTRACT

A sliding weight scale includes a recirculating ball spindle mounted in a balance beam arranged to pivot about a swivel axis. The spindle extends perpendicularly of the swivel axis. A sliding weight is engaged via a nut with the spindle. A gear wheel is fixed to the spindle and is driven by another gear wheel fixed on the base plate of the scale. A hand wheel drives an intermediate gear assembly which, in turn, drives the gear wheels and the spindle. The gear wheels driving the spindle are located in a vertical plane containing the swivel axis of the balance beam. By the use of the recirculating ball spindle, the displacement forces acting on the sliding weight are kept small so that dimensional variations occurring in manufacturing and assembly have a negligible effect on the weighing accuracy of the scale.

8 Claims, 3 Drawing Figures

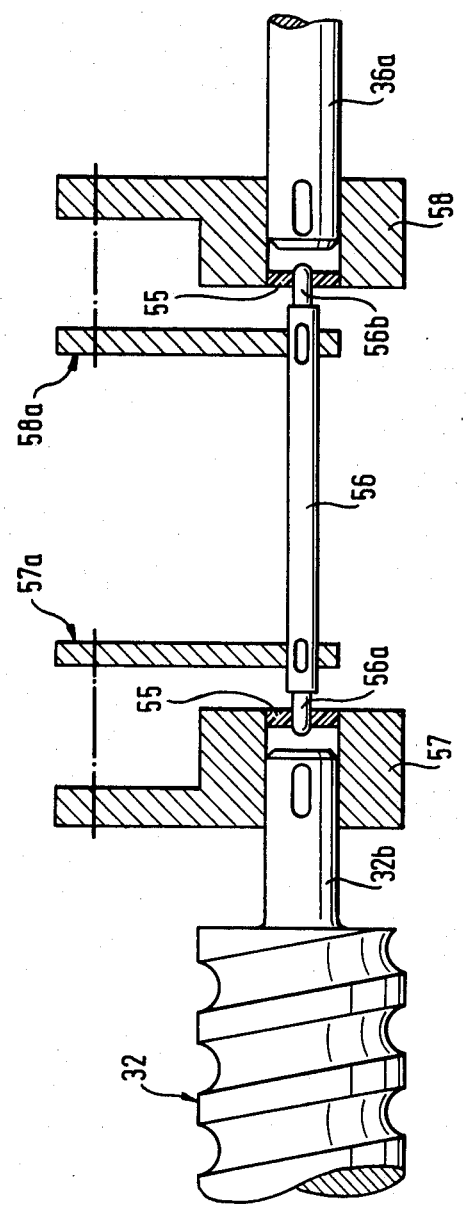

SLIDING WEIGHT SCALE

The invention relates to a sliding weight scale with a balance beam supported so as to swivel on supporting knife edges or the like. A threaded spindle is rotatably supported on the balance beam at a right angle to the swivel axis. A sliding weight is engaged on the threaded spindle by a nut and secured against rotation. The sliding weight scale has a drive gear assembly which has a drive wheel connected with the threaded spindle and a drive wheel fixed on the frame.

Such sliding weight scales are only in use for a relatively small accuracy of measure because the weighing period takes 100 seconds or more and during this time the spindle is to be rotated constantly. Relatively long spindles are used, some of which have a motor-driven spindle drive, however, a simple inexpensive control for the motor has not yet been achieved.

Simple sliding weight scales with great accuracy which are also suitable for hand operation do not permit economic execution with so-called spindle beams. In practice it is necessary to take into consideration displacement forces of the sliding weight from 3 to 5 N and a beam moment of 1 to 1.5 Nmm per unit of weight on the scale for adjusting the sliding weight on the swivel axis of the beam. For technical reasons relating to calibration, errors resulting through inexact transmission of the displacement force from the base to the balance beam make up only approximately 10% of this beam moment of a maximum of 1.5 Nmm. This would mean that the displacement force would have to be introduced in the swivel axis in a range of ±0.03 mm with extreme accuracy. If, in addition, it is borne in mind that this very exact tolerance range must also be guaranteed at extreme temperatures and after several years of operation, the construction would be much too costly, so this construction type is excluded for reasons of economy.

Today, therefore, only such sliding weight scales with spindle actuation are used which employ simple rotated spindles of a correspondingly long construction. Such spindles have an accuracy of 0.03 mm. If it is desired to double the accuracy, the length of the spindle would be halved, which would require precision spindles whose cost far exceeds the doubled manufacturing costs of the longer spindle. Despite a general trend toward miniaturization, the construction of such scales has had to be refrained from for cost reasons.

The object of the invention is to provide a sliding weight scale of the type named in the beginning, which has a great accuracy and, at the same time, has small overall dimensions and which fulfills the requirements of a safety scale, can be operated by hand an requires only a short weighing period.

In particular, the new scales would resolve to 5,000 units of measurement and the weighing period should lie within the range of 15 seconds.

This object is met according to the invention by forming the threaded spindle as a precision recirculating ball spindle, known per se, in which the female thread of the sliding weight is engaged with the male thread of the spindle via a quantity of ball-shaped rolling members.

Another feature of the invention consists in that a spindle nut is provided on the sliding weight, preferably inserted in a borehole of the sliding weight.

Such recirculating ball spindles are known and are used in machines or for controlling devices because of the known very high efficiency. Since such recirculating ball spindles are far more expensive than normal precision spindles, whose costs are already economically unfeasible for sliding weight scales, the use of the principle of recirculating ball spindles has not been considered at all in scale construction.

The invention, however, is based on the understanding that, in employing a recirculating ball spindle, use is made not only of the high efficiency inherent in this principle, but, because of substantially reduced displacement forces, a correspondingly higher work tolerance can be permitted in introducing displacement force into the balance beam. In contrast to the disadvantage of the expensive recirculating ball spindle, there are now many greater advantages in the production of scales, from the point of view of construction and on technical manufacturing grounds, which permit the production of a sliding weight scale for hand operation with small dimensions but with high accuracy and a short weighing period whose production costs are favorable as a whole.

According to a further development of the invention the center of gravity of the sliding weight is situated on that axis which intersects the uppermost rolling members acting in the direction opposite to the force of gravity. Since, according to the invention, only the uppermost rolling members perform a bearing function in recirculating ball spindles in horizontal operation, the weight-determined displacement of the sliding weight during rotation of the spindle is produced ultimately also only by means of these rolling members. Uncontrolled rocking motions of the sliding weight within the scope of work tolerances with respect to the recirculating ball spindle and the spindle nut have no effect on weighing when the center of gravity is located as suggested according to the invention.

A movement of the sliding weight in the direction of the spindle, even without spindle rotation, is possible by means of the above-mentioned work tolerances. To eliminate such disturbing influences, it is advisable that the center of gravity of the sliding weight be located outside the distance defined by the uppermost rolling members acting in a direction opposite to the force of gravity. By means of this arrangement of the center of gravity a deliberate pitching or tilting moment is established which constantly acts on the sliding weight and which eliminates any play between the recirculating ball spindle and the spindle nut. A displacement of the sliding weight is then possible exclusively by means of the rotation of the spindle.

When employing normal precision thread spindles the consequently high rotary force on the swivel axis of the balance beam must lie in the direction of the spindle axis for the protection of the knife-edge support. Thus the axes of the two drive wheels extend perpendicularly to the spindle axis so that two bevel gear wheels are still required on the balance beam to achieve the axial direction of the spindle. In the development according to the invention, however, the rotary force is so small that it can be introduced in the direction of the swivel axis of the beam over the swivel axis of the beam onto the beam. The knife edges can absorb this small rotary force from the initial load on the scale through their friction alone.

Another proposal of the invention relates to the angular conformation of the transfer of the weight-proportional rotational movement to the rcirculating ball spindle swivelling with the beam originating from the actuating gear assembly fixed on the frame. The cause of errors here can lie in the fabrication of the individual structural components as well as in their assembly, in particular, in the arrangement of the parts fixed on the frame relative to the swivelling balance beam. The transmission of the rotational movement from the final swivel part of the actuating gear assembly, i.e., from the drive wheel fixed on the frame to the recirculating ball spindle, is advisably achieved through a shaft whose ends are arranged in plastic sleeves. Phase angle errors from the radial deviation of the revolving parts is thereby prevented in an especially simple manner. The shaft proposed according to the invention makes possible simple slide bearings, for example, by means of pins formed onto the shaft and arranged in the plastic sleeves. When the bearing length is sufficiently short, the bearing play of the pins permits the swivelling movement of the recirculating ball spindle without reaction. In fashioning such slide bearings, the fact that there is no relative rotation between the pins formed onto the shaft and the plastic sleeves is particularly advantageous. The rotary forces themselves are then transmitted from the drive wheel to the shaft or from the shaft to the recirculating ball spindle, respectively, on both ends of the shaft through simple structural components, for example, in the form of carriers.

Figure 2:
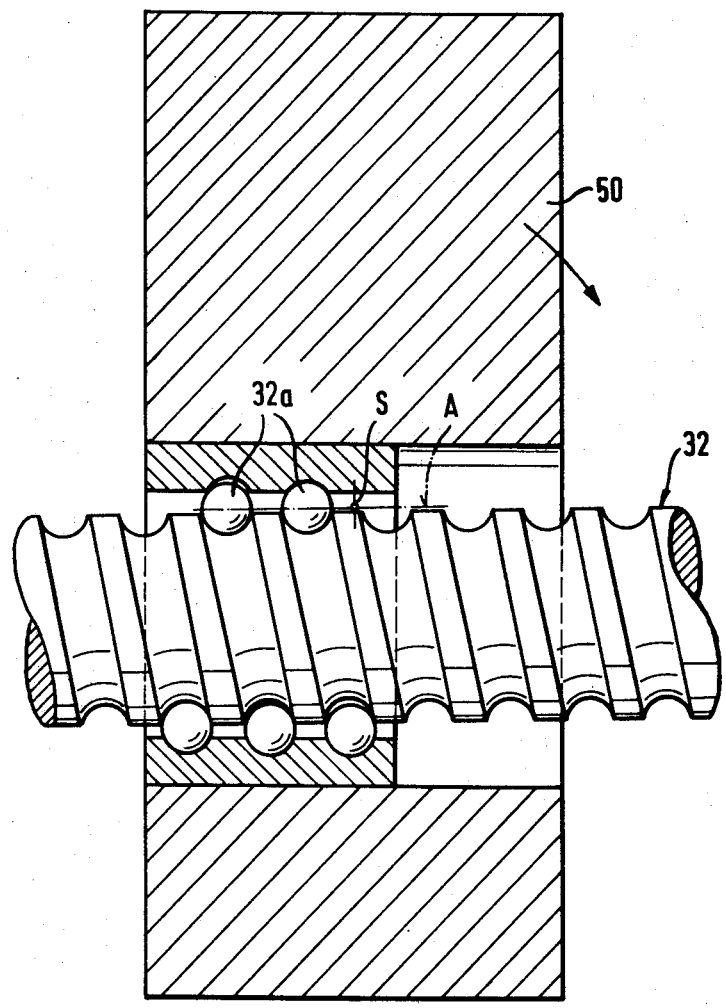

The invention will now be explained in more detail with the help of the drawings representing them by way of example. They show:

FIG. 1—a perspective view of the essential parts of a sliding weight scale,

FIG. 2—a simplified representation of the arrangement of the sliding weight,

FIG. 3—another possible drive arrangement for the recirculating ball spindle compared with FIG. 1.

As shown in FIG. 1 two supporting blocks, 12, 14 are fastened on a base plate 10, in which supporting blocks a beam 16 is supported by means of supporting knife edges 18, 20 so as to swivel around an axis 22. The beam 16 has a load knife edge 24 by means of which a load 26 is introduced into the beam 16. The state of equilibrium is attained when, in a known manner, the indicator 28 fixed on the beam is located opposite the indicator 30 on the base.

A recirculating ball spindle 32 is rotatably supported in the balance beam 16 at a right angle with the swivel axis 22 and is connected with a spur gear 34. This spur gear 34 meshes with spur wheel 36 which is fixed on the frame and which is rotated, in turn, by a drive wheel 40 fastened on the drive shaft 38. Shaft 38 is rotatable by a handwheel 44 by means of spiral gear 42. An indicator device 46 in the form of a digital counting mechanism is arranged in a firm gear-engagement with shaft 38.

A spindle nut 48 can be screwed onto recirculating ball spindle 32 and is non-rotatably inserted in a borehole in a sliding weight 50. Sliding weight 50 is secured in the state of equilibrium against rotation around the spindle axis by means of a roller 52 supported on a rail 54 attached to the base. The line of engaement of whweel pair 34, 36 coincides with the swivel axis 22 of balance beam 16 and the axes of gear wheels 34, 36 and spindle 32 are parallel. This construction is only possible at all thanks to small displacement forces which are attained with the recirculating ball spindle 32. In practice, sliding weight 50 weighs from 3 to 5 kg and gear wheel 34 is at least about 3 mm thick for technical reasons relating to manufacturing.

FIG. 2 shows sliding weight 50 supported on recirculating ball spindle 32 by means of spindle nut 48. Rolling members are indicated in a simplified form, wherein, in the present case, two rolling members 32a are arranged in the uppermost position in the direction opposite to the force of gravity. The center of gravity S of sliding weight 50 is located on axis A which intersects rolling members 32a. As is further shown in FIG. 2, center of gravity S of sliding weight 50 is located on axis A effectively outside the distance defined by the two rolling members 32a. Accordingly, this arrangement of the center of gravity S, in the corresponding arrangement shown by way of example in FIG. 2, leads to a pitching or tilting moment acting in the clockwise direction.

In a modification of the arrangement corresponding to FIG. 1, FIG. 3 shows another possibility for connecting recirculating ball spindle 32 with drive wheel 36 which drive wheel 36 is not shown in FIG. 3. In particular, this is achieved by means of arranging carriers 57, 58 non-rotatably on a pin 36a non-rotatably connected with drive wheel 36 and on shaft stub 32b. For the transmission of rotary movement carriers 57, 58 are coupled to one another by means of transfer elements 57a, 58a fastened non-rotatably on shaft 56. Thus, as shown in FIG. 3, the actual connection between recirculating ball spindle 32 and drive wheel 36 is effected by means of shaft 56. Shaft 56 is arranged in plastic sleeves 55 by means of pins 56a, 56b.

The drive arrangements, with which we are concerned here, which lead to great precision and which are described in particular in FIG. 1, as well as in FIG. 3, are derived exclusively from the utilization of the proposed recirculating ball spindle according to the invention. Only small displacement forces occurring by means of these arrangements permit the precise operation in the proposed way.

I claim:

1. Sliding weight scale comprising a base plate, support blocks secured on said base plate, a balance beam having knife edges spaced apart along a swivel axis and supported on said support blocks so that said balance beam swivels on the swivel axis, a threaded spindle supported on said balance beam with the axis of said spindle extending perpendicularly to the swivel axis, a sliding weight in threaded engagement on said threaded spindle, means for securing said sliding weight against rotation about said threaded spindle, a drive gear assembly mounted on said base plate and including a first spur gear supported in a fixed position on said base plate, said threaded spindle is a recirculating rolling member spindle having a male thread, said sliding weight having a female thread, and a plurality of rolling members in engagement with said female thread and said male thread and coupling said sliding weight and said spindle so that as said spindle rotates said sliding weight extending transversely of the spindle axis moves in the direction of the spindle axis.

2. Sliding weight scale, as set forth in claim 1, wherein a spindle nut having the female thread therein is secured to said sliding weight and is coupled with said threaded spindle via said rolling members.

3. Sliding weight scale, as set forth in claim 1 or 2, wherein said spindle extends horizontally, said rolling members located in the uppermost position on said spindle are located along as axis A extending parallel to the axis of said spindle, said sliding weight having the center of gravity thereof located on the axis extending through said rolling members in the uppermost position and said rolling members in the uppermost position act in an opposite direction to the force of gravity of said sliding weight.

4. Sliding weight scale, as set forth in claim 3, wherein the center of gravity of said sliding weight is located in spaced relation to said rolling members located in the uppermost position and acting in the opposite direction to the force of gravity.

5. Sliding weight scale, as set forth in claim 1 or 2, wherein the line of engagement of said first and second spur gears coincides with the swivel axis of said balance beam.

6. Sliding weight scale, as set forth in claim 1 or 2, wherein said drive gear assembly includes a shaft located on the extension of said swivel axis, plastic sleeves supporting the opposite ends of said shaft and said plastic sleeves arranged to connect said shaft to said first spur gear and to said spindle., 7. Sliding weight scale, as set forth in claim 1 or 2, wherein said drive gear assembly includes a second spur gear secured to said spindle, said second spur gear disposed in meshed engagement with said first spur gear, an intermediate gear assembly in driving engagement with said first spur gear and including a hand wheel for driving said intermediate gear assembly and said drive gear assembly.

8. Sliding weight scale, as set forth in claim 1, including a rail secured on said base plate spaced laterally from said spindle, a roller on one end of said sliding weight and said roller mounted for rolling movement on said rail.

* * * * *